F. N. CONNET.
SPEED CHANGING DEVICE.
APPLICATION FILED MAR. 25, 1911.
1,103,923.
Patented July 14, 1914.
2 SHEETS—SHEET 1.
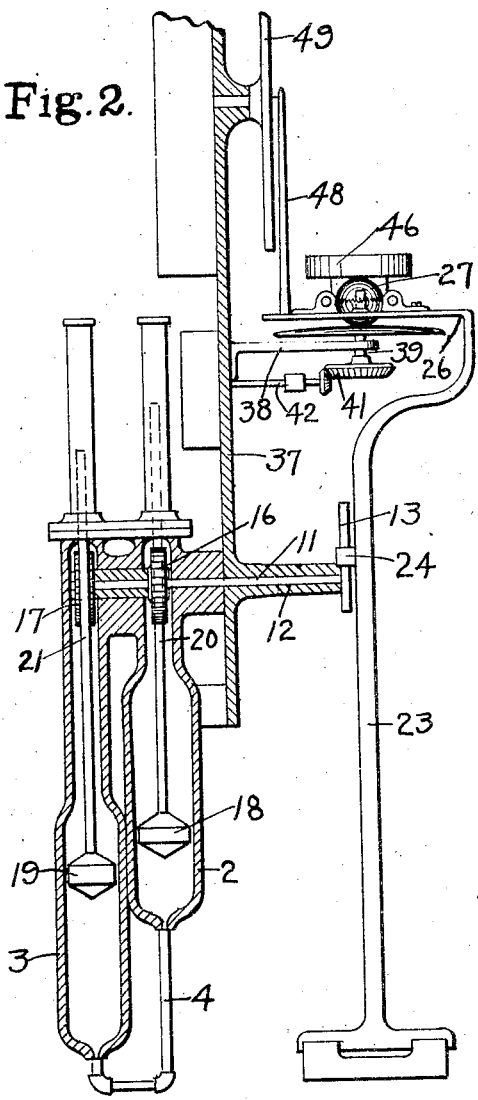
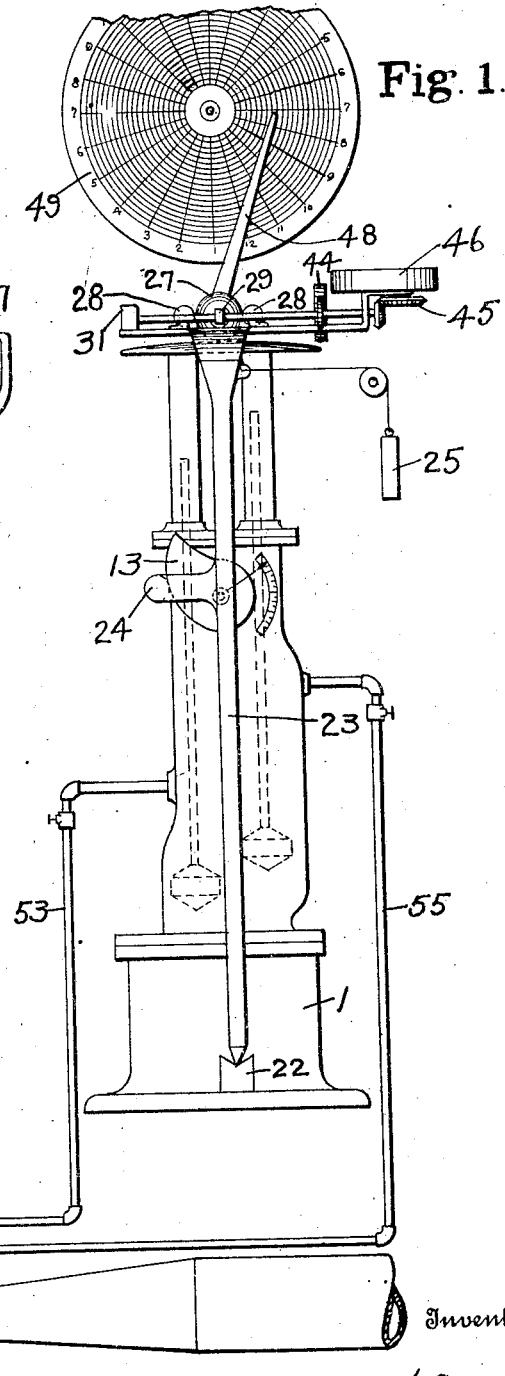
Witnesses
Chas. W. Eddy.
E. I. Ogden
Inventor
Frederick N. Connet.
By Howard E. Barlow
Attorney

F. N. CONNET.
SPEED CHANGING DEVICE.
APPLICATION FILED MAR. 25, 1911.

1,103,923.

Patented July 14, 1914.

2 SHEETS—SHEET 2.

Witnesses
Chas. W. Eddy.
E. I. Ogden

Inventor
Frederick N Connet
By Howard G Barlow
Attorney

UNITED STATES PATENT OFFICE.

FREDERICK N. CONNET, OF PROVIDENCE, RHODE ISLAND.

SPEED-CHANGING DEVICE.

1,103,923.  Specification of Letters Patent.  Patented July 14, 1914.

Application filed March 25, 1911. Serial No. 616,918.

*To all whom it may concern:*

Be it known that I, FREDERICK N. CONNET, a citizen of the United States, and resident of Providence, in the county of Providence and State of Rhode Island, have invented certain new and useful Improvements in Speed-Changing Devices, of which the following is a specification.

This invention relates to mechanism for varying the speed of movement imparted by a driving member to a driven member, and has particular reference to meters of the type illustrated and described in my Patents 920,025 of April 27, 1909, and 962,317 of June 21, 1910, especially the latter. The particular type of meter referred to is especially applicable for indicating, integrating and recording the flow of water.

With these and other objects in view, the invention consists of certain novel features of construction, as will be more fully described and particularly pointed out in the appended claims.

Figure 3:
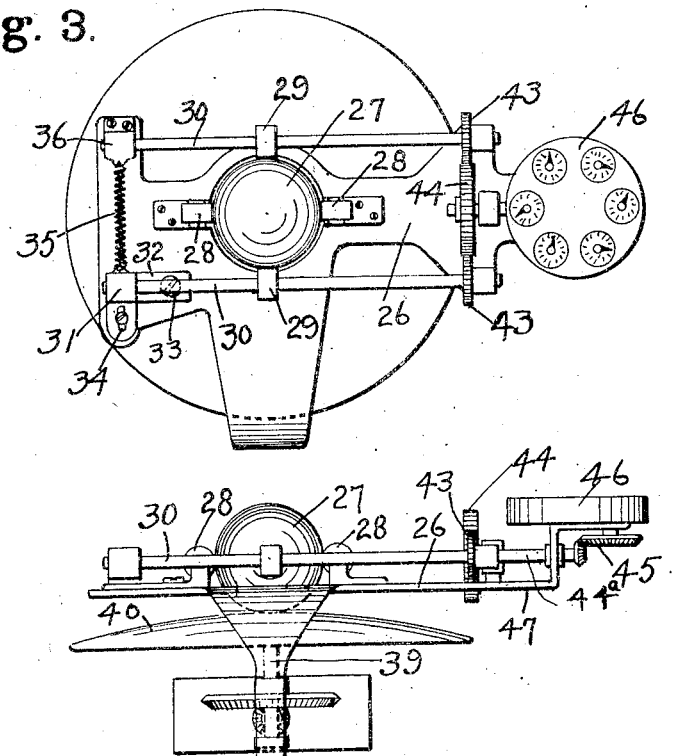
Figure 4:
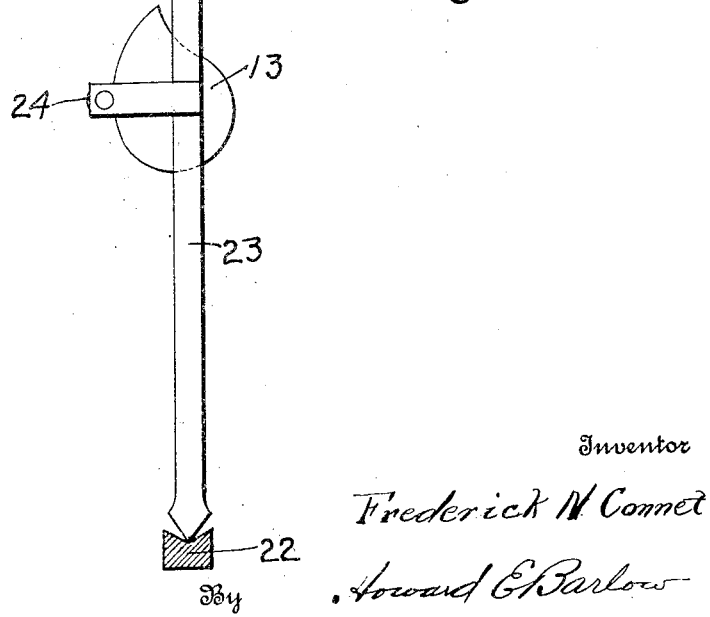

Of the accompanying drawings, in which the invention is illustrated in connection with parts of a manometer of the type illustrated in my said Patent 962,317;—Figure 1— is a front elevation of enough of the complete apparatus to illustrate one especial use of the present invention. Fig. 2— is a side elevation, partly in section, looking from the left of Fig. 1. Fig. 3— is a detail an view on a somewhat larger scale than Figs. 1 and 2. Fig. 4— is a side elevation of the parts shown in Fig. 3.

Similar reference characters indicate the same or similar parts in all of the views.

I will first briefly describe the parts of the structure illustrated which are the same as, or similar to, those embraced in my said Patent 962,317. Suitably mounted upon a base or frame 1, are two cylinders 2 and 3, which are connected by a pipe 4. A shaft 11, mounted in a bearing 12 and having an actuating cam 13, is provided with gears 16 and 17 which are actuated by floats 18 and 19, in the chambers 2 and 3 respectively, through the medium of racks 20 and 21. These parts so far mentioned are constructed, and operate, similarly to the parts bearing the same reference numerals in the Patent 962,317, so as to change the position of the cam 13 in accordance with variations of pressure difference in the chambers 2 and 3, mercury being usually employed in said chambers to actuate the floats, said floats acting to rotate the actuating cam 13 in proportion to their movement. The chamber 3 is connected by pipe 53 with the upstream side 52 of a Venturi tube, while the chamber 2, is connected with the throat 54 of said Venturi tube, by a pipe 55 so as to cause the floats to shift in the manner described in the said Patent 962,317.

Mounted on a bearing 22 is an arm 23 preferably having a knife edge support on said bearing as indicated in the drawing. Said arm is provided with a pin or roll 24 which bears against the periphery of cam 13, a counterbalance weight 25 being connected to the arm 23 to preserve contact of the said roll with the said cam in order that the rotation of the cam will swing the arm 23.

Carried by the upper end of the arm 23 is a plate 26 which, for convenience, I shall refer to as the table, said table having a circular opening for a ball 27. Preferably the table carries two anti-friction rolls 28 diametrically opposite each other and spaced to loosely receive the ball 27 between them. On opposite sides of the ball, on a diameter at an angle of ninety degrees to that of the rolls 28, are two wheels or rolls 29 each of which is, broadly speaking, a driven member, said two wheels being in frictional driving contact with ball 27. The driven wheels 29 are secured to, or are enlargements of, shafts 30 mounted in bearings above the table 26. Preferably, one of said bearings, as at 31, is carried by an arm or bracket 32 which is pivotally connected, as at 33, to the table 26. As it is only necessary for this bearing to move enough to take up the wear of the ball and roll 29 its movement of course will be extremely slight, to accommodate which movement the bearing 31 is made rather short and the hole a trifle larger than the shaft. In Fig. 3, said bracket is represented as elbow shaped, the outer arm having a slot 34 through which a guiding screw passes into the table 26. A spring 35 connects the bearing 31 with the bearing 36 for the outer end of the other shaft 30, so that the pressure of frictional contact between the ball 27 and the driven wheels 29 will be spring controlled and will therefore be practically uniform even if the ball should be slightly irregular. Of course the transmission of movement from the ball to either one or both of the wheels 29 and shafts 30 will cease if the tension of the spring be released. Projecting from the face plate 37 of the apparatus is a bracket 38, said bracket having a bearing for the vertical spindle 39 of a disk 40. Said disk might be flat, but it preferably has a convex upper surface, the center of curvature corresponding to the central point of the axis of the knife edge support of the arm 23. The ball 27 rests upon the disk 40 and is supported thereby, and it will be understood of course that if the ball 27 is at the center of disk 40, no rotation of the latter will be imparted to the ball and consequently none to the wheels 29 or their shafts. The spindle 39 is connected by gearing 41 with a shaft 42 that is driven by clock work (not shown) in a manner similar to the driving of shaft 23 in the Patent 962,317 referred to, and during the operation of the machine the disk 40 is being constantly rotated at a uniform speed.

The shafts 30 carry pinions 43 which mesh with a gear 44, the latter being mounted on short shaft 44ª which is geared as at 45 with the shaft of a counter or register 46 which is supported by a bracket 47 which is an extension of table 26.

It will now be understood that, if the cam 13 is rotated, the arm 23 is moved on its knife edge support so that the table 26 and the anti-friction rollers 28 carried by said table, will shift the ball 27 more or less toward or from the axis of rotation of the driving disk 40. Of course the greater the distance of the ball 27 from such axis, the greater will be the peripheral speed of movement of said ball, and the greater will be the speed imparted to the driven wheels 29 and shafts 30 and consequently to the counting mechanism or whatever else is connected to such driven members.

With the embodiment of the invention illustrated the speed changing devices described result in exhibiting the total quantities in gallons, cubic feet, or other convenient units of measure, of liquids or gases passing through the Venturi tube.

In further resemblance to the Patent 962,317 hereinbefore referred to, I may provide an arm or pointer 48 rising from the swinging table and co-acting with a record sheet carried by a disk 49 that is usually actuated at a uniform speed by suitable clock work mechanism.

With this speed changing device, there can be considerable pressure between the driving disk and the ball, without in any way affecting the ease of the radial movement of the ball when it is shifted, this being due to the fact that the ball has rolling and not sliding contact with every part or member with which it is in contact. If desired the ball may be of lead, or it may be of harder metal filled with lead, or it may be of any suitable material covered with rubber, leather, or other material having a greater friction coefficient than metal. If the ball be made of metal it may be smooth or roughened according to the particular use of the device or the preference of the user, or any other means may be employed for increasing the effectiveness of the friction drive of the ball.

In order to obtain the most accurate reading from any sensitive measuring instrument it is essential that the coefficient of friction of the moving parts be reduced to the minimum. Therefore instead of the wheel usually employed to be moved over the surface of the driving disk as illustrated in above mentioned Patent 962,317 I now employ a ball for this purpose.

Of course it is essential that the ball shall be freely rotatable in any direction relatively to its carrier, such carrier, in the present instance, including the two rolls 28 and the two wheels 29, all supported by the shiftable table 26. This capability of universal movement of the ball is necessary because it must rotate on one axis when being shifted radially of the driving disk 40 while it must rotate on a different axis as it is being driven by the disk 40. Therefore it will be readily understood that a wheel or disk mounted to rotate on a shaft having a fixed axis could not be substituted for the ball.

By the term "exhibitor" employed herein, I mean to include either of the different kinds of mechanisms which are commonly referred to as recorders, or registers, or indicators or integrating devices.

The arm 23, elongated and supported upon a pivot below the substantial center of gravity of the said arm, and the parts carried thereby, constitute in effect an inverted pendulum in that the entire weight of the said arm and whatever is carried thereby is supported at a single pivotal point that is well below the center of gravity thereof.

I claim:

1. In a measuring device an exhibitor and mechanism for actuating the latter, said mechanism including a driving disk disposed substantially in a horizontal plane, a driven member, an intermediate gravity retained ball for transmitting motion from said disk to said driven member, and means for shifting the ball bodily relatively to the axis of the disk, whereby the reading of the exhibitor is controlled.

2. In a measuring device of the character described, an exhibitor, a driving disk disposed substantially in a horizontal plane, a driven member, and intermediate gravity retained ball for transmitting motion from the disk to said exhibitor through said driven member, and means for shifting the ball bodily relatively to the axis of the disk.

3. A measuring device comprising an inverted pendulum, an exhibitor carried thereby, a Venturi tube and means actuated by differences of pressure in said tube for actuating said pendulum and exhibitor said means including a driving disk and a driven member, an intermediate ball for transmitting motion from said disk to said exhibitor, and means for shifting the ball relatively to the axis of said disk.

4. In a measuring device an inverted pendulum an exhibitor carried thereby, a driving disk, a driven member through which said exhibitor is operated said member being supported by said inverted pendulum, and a ball for transmitting motion from the disk to the driven member for controlling the action of said exhibitor.

5. In a measuring device, an exhibitor, an oscillating arm carrying said exhibitor, a pair of shafts having anti-friction rolls, a ball between and in contact with said rolls, a spring for holding the shaft rolls in contact with the ball, and a rotatable ball driving disk on which the ball rests and through the movement of which disk the exhibitor is operated through the ball and one of said shafts.

In testimony thereof I affix my signature in presence of two witnesses.

FREDERICK N. CONNET.

Witnesses:
HOWARD E. BARLOW,
E. I. OGDEN.